United States Patent

[11] 3,624,187

[72] Inventors Jean Marie Cheymol
 Paris;
 Pierre Eugene Chabrier de Lassauniere, Paris; Thuong Than Nguyen, Olivet, Loiret; Philippe Robert Sauignac, Paris, all of France
[21] Appl. No. 681,005
[22] Filed Nov. 6, 1967
[45] Patented Nov. 30, 1971
[73] Assignee Centre National de La Recherche Scientifique
 Paris, France
[32] Priority Nov. 7, 1966
[33] France
[31] 83,766

[54] DIPHOSPHORYL DERIVATIVES OF THIOETHANOLAMINE
 12 Claims, No Drawings
[52] U.S. Cl. ..................................................... 260/926, 260/247, 260/247.2 B, 260/293.4 B, 260/347.2, 260/959, 260/979, 260/984, 424/204
[51] Int. Cl. ..................................................... A01n 9/36, C07f 9/08, C07f 9/24

[50] Field of Search........................................... 260/926, 959

[56] References Cited
UNITED STATES PATENTS
3,117,150  1/1964  Kerschner et al............  260/926

Primary Examiner—Charles B. Parker
Assistant Examiner—Richard L. Raymond
Attorney—Stevens, Davis, Miller & Mosher ABSTRACT: Diphosphoryl derivatives of thioethanolamine of the formula:

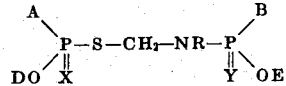

wherein A and B each represent an alkyl, alkoxy, haloalkoxy, alkoxyalkoxy, alkylthio, alkenyloxy, alkenylthio, aryl, aryloxy, furlalkoxy, amino or substituted amino group,
D and E each represent an alkyl or aryl group,
R is hydrogen, methyl or ethyl; and
X and Y each represent oxygen or sulfur, which are useful as anticholinesterase compounds and as agricultural acaricides.

DIPHOSPHORYL DERIVATIVES OF THIOETHANOLAMINE

The present invention provides, as new compounds, diphosphoryl derivatives of thioethanolamine of the formula:

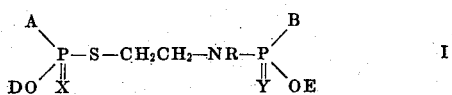   I in which A and B each represent an alkyl, alkoxy, haloalkoxy, alkoxyalkoxy, alkylthio, alkenyloxy, alkenylthio, aryl, aryloxy, furylalkoxy, amino, or substituted amino group, D and E each represent an alkyl or aryl group, R is hydrogen, methyl or ethyl and X and Y each represent oxygen or sulfur. Preferably A and B each represent lower alkoxy, chloro (lower alkoxy), lower alkoxy (lower alkoxy), lower alkenylthio, phenoxy, furfuryloxy, di(lower alkyl) amino, piperidino, or morpholino, and D and E each represent lower alkyl or phenyl. As used herein, the term "lower" as applied to an organic radical means that the radical in question contains not more than four carbon atoms.

According to a feature of the invention the compounds of formula I are prepared by reacting together an N-(βhalogenoethyl)phosphoramide or thiophosphoramide and a salt of a thiophosphoric or dithiophosphoric acid of the respective formulas:

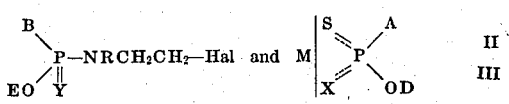   II   III where Hal is halogen, preferably bromine, M is a cation preferably of an alkali metal such as sodium, or a tetraalkylammonium, e.g., tetramethyl-ammonium, ion and A B, D, E, R, X and Y are as hereinbefore defined.

The condensation of the phosphoramide or thiophosphoramide of formula II with the thiophosphate or the dithiophosphate of formula III may be carried out in an inert organic diluent such as chloroform or acetonitrile.

The starting phosphoramide or thiophosphoramide of formula II may be prepared by condensing a 2 - halogenoethylamine with a halide, preferably chloride of a phosphoric or thiophosphoric acid of formula

   IV where Hal, B, E and Y are as hereinbefore defined.

The reaction may be carried out in an inert organic diluent such as chloroform, in the presence of a halogen hydracid acceptor. More particularly, the hydrobromide of 2 - bromoethylamine may be reacted with the acid chloride in the presence of a tertiary amine, for example triethylamine.

The two stages of the process may be diagrammatically represented as follows:

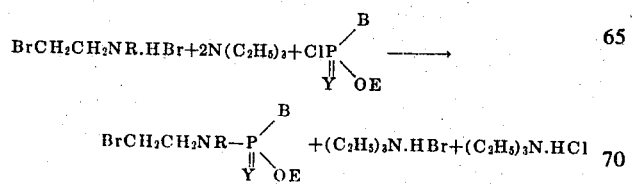

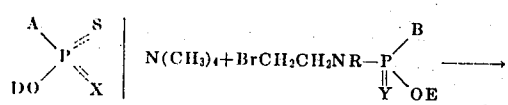

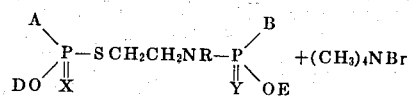

The bromides of formula

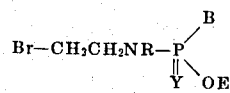

are new compounds and form part of the invention.

The following nonlimiting examples illustrate the invention.

EXAMPLE 1 a. O,O-diisopropyl-N β-bromoethylphosphoramide.

Into a 250 ml. three-necked round-bottomed flask provided with a dropping funnel, a stirrer, a thermometer and a silica gel tube to isolate it from the outside, 0.1 mol. of diisopropyl chlorophosphate in solution in 100 ml. of anhydrous chloroform is introduced. 0.1 mol of dry, finely crushed bromoethylamine hydrobromide is added. A solution of 0.22 mol of triethylamine (10 percent excess) in 25 of anhydrous chloroform is slowly added drop-by-drop at between 25° and 30° C. The solution obtained when the addition has been completed is completely clear and slightly colored. The stirring is continued for 1 hour after the addition.

The product is washed two to three times with distilled water and the chloroform solution is collected and dried over sodium sulfate.

The chloroform is driven off in vacuo and the product is distilled, under a low pressure of nitrogen maintained by a pump, to obtain the pure product. Regardless of the precautions taken the distillation is always accompanied by slight decomposition. At the end of the distillation, the phosphoramide crystallises, b.p. 100°–103° C./ 0.05 mm. Hg, 70 percent yield.

Analysis:

Calculated percent: C=33.3, H=6.5, N=4.86, P=10.74, Br=27.8

Found percent: C=33.46, H=6.62, N=4.93, P=10.85, Br=27.83 b. O,O-dimethyl-S-(O,O-diisopropylphosphoramido) ethyl thiophosphate.

0.1 mol of diisopropyl-β-bromoethylphosphoramide in solution in 60 ml. of anhydrous chloroform is introduced into a flask. To this solution 0.105 mol of tetramethylammonium O, O-dimethylthiophosphate is rapidly added. The flask is hermetically sealed and heated to 40° C. on the water bath. A white precipitate of tetramethylammonium bromide appears after a few moments. The heating is continued for several hours to complete the reaction.

After cooling, the tetramethylammonium bromide is collected (85 percent yield). The filtrate is washed with a 4 percent aqueous sodium bicarbonate solution until an alkaline pH is obtained, and then 2 to 3 times with distilled water. The product is dried over sodium sulfate and the chloroform is completely driven off in vacuo at 40° C. 27 g. of a very slightly colored oil, $n_{20}{}^D = 1.4654$, 79 percent yield, are obtained.

EXAMPLES 2 to 16 a. By the procedure of example 1a employing other acid chlorides, the following compounds are obtained:

| Formula | Acid chloride | B.P. ° C./mm. Hg or M.P. ° C. | Yield, percent |
|---|---|---|---|
| (CH$_3$O)$_2$PNHCH$_2$CH$_2$Br ‖ O | (CH$_3$O)$_2$PCl ‖ O | B.P./0.05 mm.Hg=118–119°. Only 30% of the compound disitils. It decomposes spontaneously at about 175° C. | [1] 66 |
| (C$_2$H$_5$O)$_2$PNHCH$_2$CH$_2$Br ‖ O | (C$_2$H$_5$O)$_2$PCl ‖ O | Decomposes at about 170° C | [1] 76 |
| (n-C$_3$H$_7$O)$_2$PNHCH$_2$CH$_2$Br ‖ O | (n-C$_3$H$_7$O)$_2$PCl ‖ O | B.P./0.05 mm.Hg=123–124° C | 69 |
| (C$_6$H$_5$O)$_2$PNHCH$_2$CH$_2$Br ‖ O | (C$_6$H$_5$O)$_2$PCl ‖ O | M.P.=45° C | 80 |
| (ClC$_2$H$_4$O)$_2$PNHCH$_2$CH$_2$Br ‖ O | (ClC$_2$H$_4$O)$_2$PCl ‖ O | About 30° C | 80 |
| (C$_2$H$_5$O)$_2$PNHCH$_2$CH$_2$Br ‖ S | (C$_2$H$_5$O)$_2$PCl ‖ S | Undistillable liquid | [1] 87 |
| (n-C$_3$H$_7$O)$_2$PNHCH$_2$CH$_2$Br ‖ S | (n-C$_3$H$_7$O)$_2$PCl ‖ S | do | [1] 89 |
| 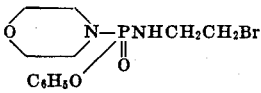 | 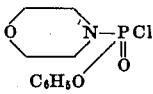 | M.P.=71–72° C | 55 |

[1] Yields of crude product.

b. From the bromoethylphosphoramides of part *a* of example 1 and of the present examples and from the ammonium salts specified in the following table, the compounds identified in the first column of the table are prepared:

| Example No. | Compounds | Salts employed | Halogenated derivative employed | Solvent | $n_{20}^D$ (or M.P.) | Yield percent |
|---|---|---|---|---|---|---|
| 2 | $(CH_3O)_2P(=O)-SCH_2CH_2NH-P(=O)(OCH_3)_2$ | $(CH_3O)_2P(=S)(-S^-)\ N(CH_3)_4^+$ | $BrCH_2CH_2NH-P(=O)(OCH_3)_2$ | $CHCl_3$ | .......... | 60 |
| 3 | $(CH_3O)_2P(=S)-SCH_2CH_2NH-P(=O)(OC_2H_5)_2$ | $(CH_3O)_2P(=O)(-S^-)\ N(CH_3)_4^+$ | $BrCH_2CH_2NH-P(=O)(OC_2H_5)_2$ | $CHCl_3$ | 1.470 | 62.5 |
| 4 | $(CH_3O)_2P(=S)-SCH_2CH_2NH-P(=O)(O-n-C_3H_7)_2$ | Same as above | $BrCH_2CH_2NH-P(=O)(O-n-C_3H_7)_2$ | $CHCl_3$ | 1.4689 | 63 |
| 5 | $(C_2H_5O)_2P(=S)-SCH_2CH_2NH-P(=O)(OC_2H_5)_2$ | $(C_2H_5O)_2P(=O)(-S^-)\ N(CH_3)_4^+$ | $BrCH_2CH_2NH-P(=O)(OC_2H_5)_2$ | $CH_3CN$ | 1.4682 | 77.6 |
| 6 | $(C_2H_5O)_2P(=S)-SCH_2CH_2NH-P(=O)(O-i-C_3H_7)_2$ | Same as above | $BrCH_2CH_2NH-P(=O)(O-i-C_3H_7)_2$ | $CH_3CN$ | 1.4608 | 73 |
| 7 | $(n-C_3H_7O)_2P(=S)-SCH_2CH_2NH-P(=O)(O-i-C_3H_7)_2$ | $(n-C_3H_7O)_2P(=O)(-S^-)\ N(CH_3)_4^+$ | Same as above | $CH_3CN$ | 1.4622 | 90 |
| 8 | $(CH_3O)_2P(=S)-SCH_2CH_2NH-P(=O)(O-n-C_3H_7)_2$ | $(CH_3O)_2P(=S)-S^-Na^+$ | $BrCH_2CH_2NH-P(=O)(O-n-C_3H_7)_2$ | $CH_3CN$ | 1.4935 | 86 |
| 9 | $(C_2H_5O)_2P(=S)-SCH_2CH_2NH-P(=O)(OC_2H_5)_2$ | $(C_2H_5O)_2P(=S)-S^-Na^+$ | $BrCH_2CH_2NH-P(=O)(OC_2H_5)_2$ | $CH_3CN$ | 1.4989 | 80 |
| 10 | $(C_2H_5O)_2P(=S)-SCH_2CH_2NH-P(=O)(O-n-C_3H_7)_2$ | Same as above | $BrCH_2CH_2NH-P(=O)(O-n-C_3H_7)_2$ | $CH_3CN$ | 1.4920 | 85 |
| 11 | $(C_2H_5O)_2P(=S)-SCH_2CH_2NH-P(=O)(O-i-C_3H_7)_2$ | ...do... | $BrCH_2CH_2NH-P(=O)(O-i-C_3H_7)_2$ | $CH_3CN$ | 1.4872 | 89 |
| 12 | $(C_2H_5O)_2P(=S)-SCH_2CH_2NH-P(=O)(OC_6H_5)_2$ | $(C_2H_5O)_2P(=O)(-S^-)\ N(CH_3)_4^+$ | $BrCH_2CH_2NH-P(=O)(OC_6H_5)_2$ | $CH_3CN$ | M.P.<50° C. | 90 |
| 13 | morpholino-$N=P(=O)-SCH_2CH_2NH-P(=O)(O-i-C_3H_7)_2$ (with $H_3CO$) | morpholino-$N=P(=S)-SNa$ (with $H_3CO$) | $BrCH_2CH_2NH-P(=O)(O-i-C_3H_7)_2$ | $CH_3CN$ | .......... | 71 |
| 14 | $(C_2H_5O)_2P(=S)-SCH_2CH_2NH-P(=O)(OC_2H_4Cl)_2$ | $(C_2H_5O)_2P(=S)-SNa$ | $BrCH_2CH_2NH-P(=O)(OC_2H_4Cl)_2$ | $CH_3CN$ | 1.5198 | 91 |
| 15 | $(C_2H_5O)_2P(=S)-SCH_2CH_2NH-P(=O)(OC_6H_5)_2$ | Same as above | $BrCH_2CH_2NH-P(=O)(OC_6H_5)_2$ | $CH_3CN$ | 1.5160 | 91 |
| 16 | $(C_2H_5O)_2P(=S)-SCH_2CH_2NH-P(=O)(OC_6H_5)_2$ | ...do... | $BrCH_2CH_2NH-P(=O)(OC_6H_5)_2$ | $CH_3CN$ | M.P.=67° C. | 95 |

EXAMPLES 17–63

The structural formulas refractive index or melting point and yield of other compounds produced in accordance with the invention are given in the table below.

| Example No. | Formula | Refractive index $n_D^{20}$ or melting point | Yield, percent |
|---|---|---|---|
| 17 | $(CH_3O)_2P(S)-SCH_2CH_2NH-P(O)(O-iC_3H_7)_2$ | 1.4899 | 68.5 |
| 18 | $(C_2H_5O)_2P(O)-SCH_2CH_2NH-P(O)(OCH_2CH_2Cl)_2$ | 1.4866 | 60 |
| 19 | $(n-C_3H_7O)_2P(O)-SCH_2CH_2NH-P(O)(OCH_2CH_2Cl)_2$ | 1.4868 | 90 |
| 20 | $(CH_3O)_2P(O)-SCH_2CH_2NH-P(O)(OCH_2CH_2Cl)_2$ | 1.494 | 73 |
| 21 | $(C_2H_5)_2P(S)-SCH_2CH_2NH-P(O)(OC_6H_5)_2$ | M.P.=66° C. | 90 |
| 22 | $(C_2H_5O)_2P(O)-SCH_2CH_2NH-P(O)(OC_6H_5)_2$ | M.P.=28° C. | 80 |
| 23 | (morpholino)(CH$_3$O)P(O)-SCH$_2$CH$_2$NH-P(O)(O-iC$_3$H$_7$)$_2$ | 1.4872 | 70 |
| 24 | $(n-C_3H_7O)_2P(O)-SCH_2CH_2NH-P(O)(OC_6H_5)_2$ | 1.5334 | 90 |
| 25 | (C$_6$H$_5$)(CH$_3$O)P(O)-SCH$_2$CH$_2$NH-P(O)(O-iC$_3$H$_7$)$_2$ | 1.511 | 96 |
| 26 | $(CH_3O)_2P(O)-SCH_2CH_2NH-P(O)(OC_6H_5)_2$ | 1.548 | 68 |
| 27 | (C$_6$H$_5$)(CH$_3$O)P(O)-SCH$_2$CH$_2$NH-P(O)(OC$_6$H$_5$)$_2$ | 1.521 | 87 |
| 28 | (CH$_3$)(CH$_3$O)P(O)-SCH$_2$CH$_2$NH-P(O)(O-iC$_3$H$_7$)$_2$ | 1.4724 | 95 |
| 29 | (morpholino)(CH$_3$O)P(O)-SCH$_2$CH$_2$NH-P(O)(OC$_2$H$_5$)$_2$ | 1.4938 | 85 |
| 30 | (morpholino)(CH$_3$O)P(O)-SCH$_2$CH$_2$NH-P(O)(O-nC$_3$H$_7$)$_2$ | 1.4888 | 80 |
| 31 | (CH$_3$O)(C$_2$H$_5$O)P(O)-SCH$_2$CH$_2$NH-P(O)(OC$_2$H$_5$)$_2$ | 1.4701 | 82 |
| 32 | (CH$_3$O)(C$_2$H$_5$O)P(O)-SCH$_2$CH$_2$NH-P(O)(O-iC$_3$H$_7$)$_2$ | 1.4634 | 94 |
| 33 | (CH$_3$O)(nC$_3$H$_7$O)P(O)-SCH$_2$CH$_2$NH-P(O)(OC$_2$H$_5$)$_2$ | 1.4674 | 82 |
| 34 | (CH$_3$O)(nC$_3$H$_7$O)P(O)-SCH$_2$CH$_2$NH-P(O)(O-iC$_3$H$_7$)$_2$ | 1.4625 | 89 |
| 35 | ((C$_2$H$_5$)$_2$N)(CH$_3$O)P(O)-SCH$_2$CH$_2$NH-P(O)(O-iC$_3$H$_7$)$_2$ | 1.4721 | 97 |

| Example No. | Formula | Refractive index $n_D^{30}$ or melting point | Yield, percent |
|---|---|---|---|
| 36 | ![piperidine]N-P(-SCH$_2$CH$_2$NH-P(O-iC$_3$H$_7$)$_2$)(CH$_3$O)(=O) with =O on second P | 1.484 | 95 |
| 37 | (tetrahydrofuranyl)-CH$_2$O, CH$_3$O\P(=O)-SCH$_2$CH$_2$NH-P(O-iC$_3$H$_7$)$_2$(=O) | 1.475 | 88 |
| 38 | (C$_2$H$_5$)$_2$N, CH$_3$O\P(=O)-SCH$_2$CH$_2$NH-P(OC$_2$H$_5$)$_2$(=O) | 1.4775 | 96 |
| 39 | C$_4$H$_9$O, CH$_3$O\P(=O)-SCH$_2$CH$_2$NH-P(OC$_2$H$_5$)$_2$(=O) | 1.493 | 90 |
| 40 | (piperidine)N, CH$_3$O\P(=O)-SCH$_2$CH$_2$NH-P(OC$_2$H$_5$)$_2$(=O) | 1.4927 | 90 |
| 41 | (CH$_3$O)$_2$P(=O)-SCH$_2$CH$_2$N(CH$_3$)-P(O-iC$_3$H$_7$)$_2$(=O) | 1.4542 | 96 |
| 42 | (CH$_3$O)$_2$P(=S)-SCH$_2$CH$_2$N(CH$_3$)-P(O-iC$_3$H$_7$)$_2$(=O) | 1.474 | 88 |
| 43 | (C$_2$H$_5$O)$_2$P(=S)-SCH$_2$CH$_2$N(CH$_3$)-P(O-iC$_3$H$_7$)$_2$(=O) | 1.48 | 96 |
| 44 | CH$_3$O, C$_2$H$_5$O\P(=O)-SCH$_2$CH$_2$N(CH$_3$)-P(OC$_2$H$_5$)$_2$(=O) | 1.4618 | 83 |
| 45 | CH$_3$O, C$_2$H$_5$O\P(=O)-SCH$_2$CH$_2$N(CH$_3$)-P(O-iC$_3$H$_7$)$_2$(=O) | 1.4572 | 87 |
| 46 | C$_4$H$_9$O, CH$_3$O\P(=O)-SCH$_2$CH$_2$N(CH$_3$)-P(OC$_2$H$_5$)$_2$(=O) | 1.506 | 87 |
| 47 | C$_4$H$_9$O, CH$_3$O\P(=O)-SCH$_2$CH$_2$N(CH$_3$)-P(O-iC$_3$H$_7$)$_2$(=O) | 1.4944 | 90 |
| 48 | (morpholine)N-P(=O)(CH$_3$O)-SCH$_2$CH$_2$N(CH$_3$)-P(OC$_2$H$_5$)$_2$(=O) | 1.482 | 88 |
| 49 | (morpholine)N-P(=O)(CH$_3$O)-SCH$_2$CH$_2$N(CH$_3$)-P(O-iC$_3$H$_7$)$_2$(=O) | 1.473 | 84 |
| 50 | (CH$_3$O)$_2$P(=O)-SCH$_2$CH$_2$N(C$_2$H$_5$)-P(O-iC$_3$H$_7$)$_2$(=O) | 1.4514 | 96 |
| 51 | CH$_3$O, C$_2$H$_5$O\P(=O)-SCH$_2$CH$_2$N(C$_2$H$_5$)-P(O-iC$_3$H$_7$)$_2$(=O) | 1.4526 | 92 |
| 52 | CH$_3$O, nC$_3$H$_7$O\P(=O)-SCH$_2$CH$_2$N(C$_2$H$_5$)-P(O-iC$_3$H$_7$)$_2$(=O) | 1.4528 | 98 |
| 53 | CH$_3$O, CH$_3$CH$_2$CH$_2$O\P(=O)-SCH$_2$CH$_2$NH-P(OC$_2$H$_5$)$_2$(=O) | 1.471 | 90 |

| Example No. | Formula | Refractive index $n_D^{20}$ or melting point | Yield, percent |
|---|---|---|---|
| 54 | $\begin{array}{c}CH_3O\\ \phantom{CH_3OCH_2CH_2O}\diagdown\\ \phantom{CH_3OCH_2CH_2O\ }P-SCH_2CH_2NH-P(O-iC_3H_7)_2\\ CH_3OCH_2CH_2O\diagup\ \ \|\phantom{SCH_2CH_2NH-}\|\\ \phantom{CH_3OCH_2CH_2O\ \ }O\phantom{-SCH_2CH_2NH-}O\end{array}$ | 1.467 | 96 |
| 55 | $\begin{array}{c}CH_3O\\ \phantom{CH_3OCH_2CH_2O}\diagdown\\ \phantom{CH_3OCH_2CH_2O\ }P-SCH_2CH_2N-\!-\!-P(OC_2H_5)_2\\ CH_3OCH_2CH_2O\diagup\ \ \|\phantom{SCH_2CH_2}\|\phantom{P(OC}\|\\ \phantom{CH_3OCH_2CH_2O\ \ }O\phantom{-SCH_2}CH_3\phantom{\ }O\end{array}$ | 1.4642 | 95 |
| 56 | $\begin{array}{c}CH_3O\\ \phantom{CH_3OCH_2CH_2O}\diagdown\\ \phantom{CH_3OCH_2CH_2O\ }P-SCH_2CH_2N-\!-\!-P(O-iC_3H_7)_2\\ CH_3OCH_2CH_2O\diagup\ \ \|\phantom{SCH_2CH_2}\|\phantom{P(OC}\|\\ \phantom{CH_3OCH_2CH_2O\ \ }O\phantom{-SCH_2}CH_3\phantom{\ }O\end{array}$ | 1.4755 | 86 |
| 57 | $\begin{array}{c}CH_3O\\ \phantom{CH_3CH_2O}\diagdown\\ \phantom{CH_3CH_2O\ }P-SCH_2CH_2N-\!-\!-P(O-iC_3H_7)_2\\ CH_3CH_2O\diagup\ \ \|\phantom{SCH_2CH_2}\|\phantom{P(O}\|\\ \phantom{CH_3CH_2O\ \ }O\phantom{-SCH_2}C_2H_5\phantom{\ }O\end{array}$ | 1.4526 | 87.5 |
| 58 | $\begin{array}{c}\phantom{xx}CH_3O\\ \text{(tetrahydrofurfuryl)-}CH_2O\diagup P-SCH_2CH_2NH-P(OC_2H_5)_2\\ \phantom{xxxxxxxxxxxxxxxxxxx}\|\phantom{xxxxxxxxxxx}\|\\ \phantom{xxxxxxxxxxxxxxxxxxxx}O\phantom{xxxxxxxxxxxx}O\end{array}$ | 1.4822 | 87 |
| 59 | $\begin{array}{c}CH_3O\\ \phantom{CH_2=CHCH_2S}\diagdown\\ \phantom{CH_2=CHCH_2S\ }P-SCH_2CH_2NH-P(OC_2H_5)_2\\ CH_2=CHCH_2S\diagup\ \ \|\phantom{SCH_2CH_2NH-}\|\\ \phantom{CH_2=CHCH_2S\ \ }O\phantom{-SCH_2CH_2NH-}O\end{array}$ | 1.505 | 78 |
| 60 | $\begin{array}{c}CH_3O\\ \phantom{CH_2=CHCH_2S}\diagdown\\ \phantom{CH_2=CHCH_2S\ }P-SCH_2CH_2NH-P(O-iC_3H_7)_2\\ CH_2=CHCH_2S\diagup\ \ \|\phantom{SCH_2CH_2NH-}\|\\ \phantom{CH_2=CHCH_2S\ \ }O\phantom{-SCH_2CH_2NH-}O\end{array}$ | 1.4960 | 96 |
| 61 | $\begin{array}{c}CH_3O\\ \phantom{CH_2=CHCH_2S}\diagdown\\ \phantom{CH_2=CHCH_2S\ }P-SCH_2CH_2N-\!-\!-P(OC_2H_5)_2\\ CH_2=CHCH_2S\diagup\ \ \|\phantom{SCH_2CH_2}\|\phantom{P(OC}\|\\ \phantom{CH_2=CHCH_2S\ \ }O\phantom{-SCH_2}CH_3\phantom{\ }O\end{array}$ | 1.4762 | 84 |
| 62 | $\begin{array}{c}CH_3O\\ \phantom{CH_2=CHCH_2S}\diagdown\\ \phantom{CH_2=CHCH_2S\ }P-SCH_2CH_2N-\!-\!-P(O-iC_3H_7)_2\\ CH_2=CHCH_2S\diagup\ \ \|\phantom{SCH_2CH_2}\|\phantom{P(O}\|\\ \phantom{CH_2=CHCH_2S\ \ }O\phantom{-SCH_2}CH_3\phantom{\ }O\end{array}$ | 1.469 | 91 |
| 63 | $\begin{array}{c}CH_3O\\ \phantom{CH_2=CHCH_2S}\diagdown\\ \phantom{CH_2=CHCH_2S\ }P-SCH_2CH_2N-\!-\!-P(O-iC_3H_7)_2\\ CH_2=CHCH_2S\diagup\ \ \|\phantom{SCH_2CH_2}\|\phantom{P(O}\|\\ \phantom{CH_2=CHCH_2S\ \ }O\phantom{-SCH_2}C_2H_5\phantom{\ }O\end{array}$ | 1.4630 | 90 |

None of these compounds could be distilled. The elementary analyses gave satisfactory results.

The new compounds of formula I are fairly mobile, slightly colored oils which are soluble in the usual organic solvents, sparingly soluble in water and only slightly odiferous.

They have low toxicity, as shown in the following table.

| Product of Example No. | LD 50 (mouse; intraperitoneal; in mg./kg.) |
|---|---|
| 1 | 68 |
| 3 | 60 |
| 17 | 500 to 625 |
| 18 | 19 |
| 19 | 200 |
| 20 | 64 |
| 24 | 412 |
| 25 | 18 |
| 26 | >100 |
| 27 | 5 to 10 |
| 28 | 5 |
| 29 | 19 (intravenous) |
| 30 | 500 (intravenous) |
| 31 | 12.5 |
| 32 | 30 |
| 33 | 39 |
| 34 | 155 |
| 35 | 19.6 |
| 36 | 66 |
| 37 | 75 |
| 38 | 17 |
| 39 | 58 |
| 40 | 75 |
| 41 | 141 |
| 42 | 230 |
| 43 | 130 |
| 44 | 29.5 |
| 45 | |
| 47 | 140 |
| 48 | >500 |
| 49 | 200 |

Some are endowed with intense anticholinesterase activity comparable to that of neostigmine, so that they may be employed in therapeutics using this activity e.g., in their myotic action, indirect parasympathomimetic action, or action on the neuromuscular junction).

The following table gives the toxicity and anticholinesterase activity of two of the new compounds.

| Compound | LD 50 (mouse; intraperitoneal; mg./kg.) | Anticholinesterase activity $ID_{50}$ $\gamma/ml.^1$ |
|---|---|---|
| $(i-C_3H_7O)_2PNHCH_2CH_2SP(OCH_3)_2$ with both P=O | 68 | Between 0.1 and 0.3. |
| $(C_2H_5O)_2PNHCH_2CH_2SP(OCH_3)_2$ with both P=O | 60 | Do. |
| Neostigmine | | 0.17. |

$^1 ID_{50}$=inhibiting dose.

Examination of the NMR spectra of the two compounds shows that they contain about 10–15 percent of their isomers $$(RO_2)\underset{\underset{O}{\|}}{P}-NH-CH_2-CH_2O-\underset{\underset{O}{\|}}{P}\begin{matrix}OCH_3\\ \diagdown\\ SCH_3\end{matrix}$$

formed by isomerisation of the tetramethylammonium salt $$(CH_3O)_2P\begin{matrix}\diagup O\\ \diagdown\\ S\end{matrix}\bigg| N(CH_3)_4$$

during their preparation.

The compounds of formula I are also useful as acaricides and may be used for this purpose in agriculture.

The invention therefore includes within its scope pharmaceutical and agricultural compositions comprising one or more of the compounds of formula I in association with an inert, compatible pharmaceutical or agricultural carrier. Such compositions may be made up using diluents and methods known in the respective arts.

We claim:

1. A diphosphoryl derivative of thioethanolamine of the formula:

$$\begin{matrix}A\\ \diagdown\\ DO\end{matrix}\underset{\underset{X}{\|}}{P}-SCH_2CH_2NR-\underset{\underset{Y}{\|}}{P}\begin{matrix}B\\ \diagup\\ OE\end{matrix}$$

wherein each of A and B is lower alkoxy, halo (lower alkoxy), lower alkoxy (lower alkoxy), lower alkenylthio, phenoxy or di (lower alkyl) -amino;
D is lower alkyl or phenyl;
E is lower alkyl, chloroethyl or phenyl;
R is hydrogen, methyl or ethyl; and
each of X and Y is oxygen or sulfur.

2. A diphosphoryl derivative according to claim 1 in which A and B each represent lower alkoxy, chloro(lower alkoxy), lower alkoxy (lower alkoxy), lower alkenylthio, phenoxy, or di (lower alkyl) amino, and D and E each represent lower alkyl or phenyl.

3. A compound according to claim 2 of the formula:

$$(lower\ alkoxy)_2\underset{\underset{S}{\|}}{P}-SCH_2CH_2NH\underset{\underset{O}{\|}}{P}-(lower\ alkoxy)_2$$

4. A compound according to claim 1 of the formula:

$$(lower\ alkoxy)_2\underset{\underset{S}{\|}}{P}-SCH_2CH_2NH\underset{\underset{O}{\|}}{P}-(chloro\text{-}lower\ alkoxy)_2$$

5. A compound according to claim 2 of the formula:

$$(lower\ alkoxy)_2\underset{\underset{S}{\|}}{P}-SCH_2CH_2NH\underset{\underset{O}{\|}}{P}-(phenoxy)_2$$

6. A compound according to claim 2, wherein E is lower alkyl and A is lower alkyl or lower alkoxy.

7. A compound according to claim 4 of the formula:

$$(lower\ alkoxy)_2\underset{\underset{S}{\|}}{P}-SCH_2CH_2NH\underset{\underset{O}{\|}}{P}-(chloroethoxy)_2$$

8. The compound according to claim 6 of the formula:

$$(methoxy)_2-\underset{\underset{O}{\|}}{P}-SCH_2CH_2NH-\underset{\underset{O}{\|}}{P}\ (iso\text{-}propyloxy)_2$$

9. The compound according to claim 6 of the formula:

$$(methoxy)_2-\underset{\underset{O}{\|}}{P}-SCH_2CH_2NH-\underset{\underset{O}{\|}}{P}\ (ethoxy)_2$$

10. The compound according to claim 6 of the formula:

$$\begin{matrix}methyl\\ \diagdown\\ methoxy\end{matrix}\underset{\underset{O}{\|}}{P}-SCH_2CH_2NH-\underset{\underset{O}{\|}}{P}\ (iso\text{-}propyloxy)_2$$

11. The compound according to claim 6 of the formula:

$$\begin{matrix}methoxy\\ \diagdown\\ ethoxy\end{matrix}\underset{\underset{O}{\|}}{P}-SCH_2CH_2NH-\underset{\underset{O}{\|}}{P}\ (ethoxy)_2$$

12. The compound according to claim 6 of the formula:

$$\begin{matrix}methoxy\\ \diagdown\\ n\text{-}propyloxy\end{matrix}\underset{\underset{O}{\|}}{P}-SCH_2CH_2NH-\underset{\underset{O}{\|}}{P}\ (ethoxy)_2$$

* * * * *